United States Patent [19]
Lee et al.

[11] Patent Number: 5,677,697
[45] Date of Patent: Oct. 14, 1997

[54] MILLIMETER WAVE ARRAYS USING ROTMAN LENS AND OPTICAL HETERODYNE

[75] Inventors: J. J. Lee, Irvine; Willie W. Ng, Agoura Hills; Gregory L. Tangonan, Oxnard, all of Calif.

[73] Assignee: Hughes Electronics, Los Angeles, Calif.

[21] Appl. No.: 608,589

[22] Filed: Feb. 28, 1996

[51] Int. Cl.$^6$ .................................................. H01Q 3/22
[52] U.S. Cl. .......................... 342/368; 342/376; 342/54
[58] Field of Search ................................. 342/368, 376, 342/54

[56] References Cited

U.S. PATENT DOCUMENTS

| | | | |
|---|---|---|---|
| 4,803,490 | 2/1989 | Kruger | 342/158 |
| 4,929,956 | 5/1990 | Lee et al. | 342/376 |
| 5,128,687 | 7/1992 | Fay | 343/754 |
| 5,333,000 | 7/1994 | Hietala et al. | 342/368 |
| 5,543,805 | 8/1996 | Thaniyavarn | 342/368 |

*Primary Examiner*—Mark Hellner
*Attorney, Agent, or Firm*—V. D. Duraiswamy; W. K. Denson-Low

[57] ABSTRACT

An optical heterodyne system provides the radiation source and beam scan control of a millimeter wave (MMW) array antenna. The heterodyne system is an optical feed system to produce the MMW by mixing the optical outputs from two lasers, distribute the signal source to an array of radiating elements through a Rotman lens and optical fibers, generate the differential phase shift for beam scan in the optical domain, change the beam direction by switching the input laser being used to illuminate the Rotman lens or by varying the frequency of one of the laser sources. The feed system includes a plurality n-1 lasers spaced along the transmit side of the lens, and a center laser disposed on the center axis of the transmit side. A 1:n switch receives a command input to determine which of the n-1 lasers will operate. The beat frequency between the center laser operating frequency and that of the n-1 lasers is the MMW frequency. N optical receive elements are spaced along the output side of the Rotman lens and are connected to a corresponding photodetector by equal length optical fibers. The output of each photodetector is amplified and fed to a corresponding radiating element. The system also operates in a corresponding receive mode.

22 Claims, 3 Drawing Sheets

MILLIMETER WAVE ARRAYS USING ROTMAN LENS AND OPTICAL HETERODYNE

TECHNICAL FIELD OF THE INVENTION

This invention relates to millimeter wave (MMW) array antennas, and more particularly to such an array antenna using a Rotman lens and optical heterodyne system.

BACKGROUND OF THE INVENTION

Most conventional phased arrays use a phase shifter for each element to steer the antenna beam. At MMW it becomes impractical to control the phase settings individually, because the element spacing and tolerance are so tight that they preclude such discrete packaging approaches. Thus, for MMW arrays, it is a challenge to provide an efficient way to control the beam scan of the array.

Rotman lenses are well known in the art. Optical heterodyne techniques per se are also known.

SUMMARY OF THE INVENTION

This invention provides a solution to overcome some of the problems encountered in the conventional designs of MMW array antennas in producing the radiation source and controlling the discrete phase settings for beam scan. This is accomplished by using optical heterodyne techniques and a phase translation system between the optical and RF domain. The required phase shifts are collectively produced by wave propagation and mixing in a space-fed system. Thus, the differential phase shifts are produced in the optical frequency domain and are subsequently translated to the operating RF frequency. The advantages of this photonic feed are (1) the small size compatible with the MMW wavelength, and (2) the unique flexible form factor of the fibers for high density packaging of array antennas. Furthermore, this optical heterodyne method offers an efficient technique of signal generation and beam scan.

A millimeter wave (MMW) array antenna employing an optical heterodyne system to provide a radiation source and beam scan control includes a Rotman optical lens having a center axis, a center laser disposed at the center axis on the lens transmit side for emitting light energy at a first optical frequency, and n-1 laser sources spaced around a lens transmit side for emitting light energy at a second optical frequency. The MMW operating frequency of the array antenna is equal to the beat frequency between the first and second optical frequencies. N optical receive elements are spaced along a Rotman lens receive side for receiving optical energy emitted by the lasers. Each of the laser sources have a wide field of view so as to illuminate all of the optical receive elements through the lens.

N equal length optical fibers are employed, each having a first fiber end connected to a corresponding one of the receive elements and a second end connected to a corresponding photodetector element. Each of N amplifiers has an input connected to a corresponding second fiber end of one of the optical fibers, and an output connected to a corresponding MMW radiating element of the array antenna. A selector apparatus is provided to select a particular one or ones of the n-1 lasers to operate as an optical source, wherein the selection of the particular laser determines the beam direction generated by the array antenna.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

A millimeter wave (MMW) array antenna with an optical heterodyne system to provide the radiation source and beam scan control is disclosed as an exemplary embodiment of the invention. The array employs an optical feed system to (i) produce the MMW by mixing two laser sources, (ii) distribute the signal source to an array of radiating elements through a Rotman lens and optical fibers, (iii) generate the differential phase shift for beam scan in the optical region, (iv) change the beam direction by switching the input port, or (v) scan the beam by varying the frequency of the second laser source.

Figure 1:
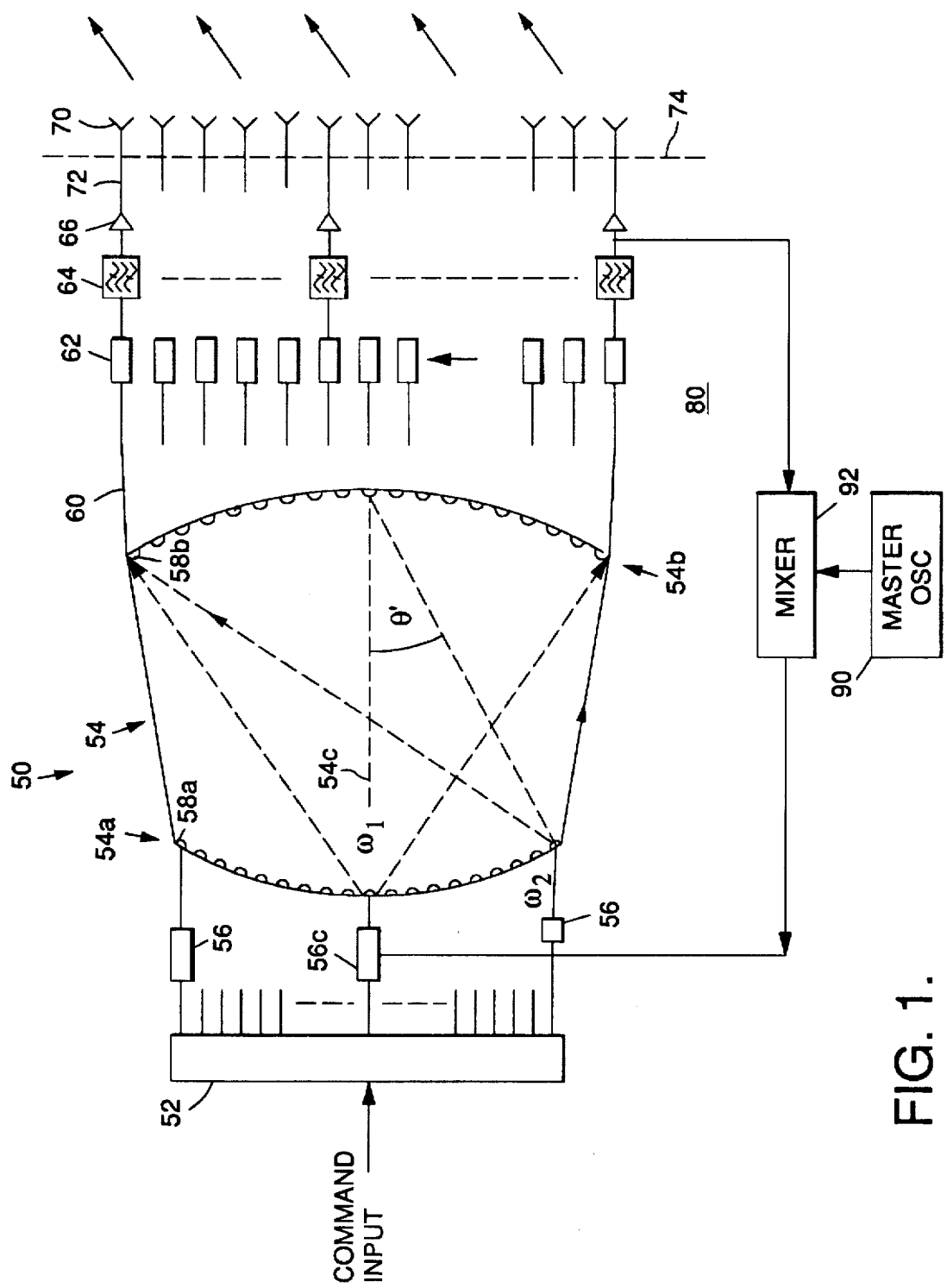
FIG. 1 is a simplified block diagram of a MMW array system embodying the invention in a transmit mode.

FIG. 1 is a simplified block diagram of a MMW array system 50 embodying the invention, operating in a transmit mode. The system 50 includes a 1:n switch 52, a Rotman lens 54 with n lasers 56 on the transmit side 54A of the lens and N optical receive elements 58 on the receive side 54B of the lens. The number n of lasers 56 need not be the same as, and will typically be different than, the number N of optical receive elements 58. The Rotman lens 54 in this exemplary embodiment is a high-silica planar waveguide for light made out of a silicon substrate. The fabrication of such an optical Rotman lens is analogous to that of optical star couplers, e.g., as described in "Design and Fabrication of Integrated-Optic 8×8 Star Coupler," K. Okamoto et al., Electronics Letters, Volume 27, No. 9, pages 774–775, Apr. 25, 1991.

The control input to each laser 56 is connected to an output port of the 1:n switch 52. A command input signal is provided to the input port of the switch 52 to determine which of the n lasers 56 is to be operated at any given time. (The center laser 56C is operated at all times during operation of the array system.) The output of each laser 56 is coupled to a corresponding one of the n beam input ports 58A by an optical fiber. The switch 52 could be constructed to allow more than one laser to be operated at any given time, thereby providing the capability of multiple simultaneous beam operation.

Each receive element 58B is pigtailed by an equal line length fiber 60 and terminated with a photodetector 62. The receive element is preferably a receptor lenslet, such as a glass bead, to collect the incident light and direct it into the optical fiber to the photodetector. A filter 64 and an amplifier 66 may be used to filter out any unwanted signal components, such as the sum of the laser frequencies, and amplify the RF signal developed by each photodetector before it is radiated by the array element 70 coupled to each optical receive element 58 by equal length cables 72. The cables 72 are passed through an aperture ground plane 74.

Every laser 56 on the transmit side 54A, except the laser 56C located at the center axis 54C, emits an optical light signal at frequency (color) $\omega 2$. The spacing dx of the receive signal elements 58 is nominally $0.5\lambda_2$, i.e., the wavelength at $\omega 2$. The size of the receiving elements 58 is selected to be such that they are touching each other to minimize spillover loss. The center axis laser 54C radiates a reference signal at frequency (color) $\omega 1$, and operates continuously, no matter which of the other lasers 56 are commanded to operate by the switch 52. The two lasers may each operate, for example, in the infrared spectrum, with their respective wavelengths differing by a desired MMW operating wavelength. Each laser light source has a wide field of view to illuminate all of the receive port elements 58B on the receive side 54B of the lens 54. The beat frequency, $\omega 2-\omega 1$, is the desired operating RF MMW frequency, $\omega 0$, of the array antenna. The photodetectors 62 are designed to respond to $\omega 0$ only, and not to the frequencies of the laser outputs.

The offset angle of any of the lasers 56 with respect to the central axis 54C is denoted $\Theta'$. The profile (curvature) of the Rotman lens 54 is usually designed in such a way that the illumination of the receiving side 54B produced by the laser 56C located at the center is quasi-uniform in amplitude and phase. For the laser light source at $\Theta'$, however, a quasi-linear progressive phase distribution exists across the receiving elements 58. The differential phase shift between any two adjacent elements 58 due to this source at $\Theta'$ is given by $(2\pi/\lambda g) \, dx \, \sin\Theta'$, where $\lambda g$ is the guide wavelength of $\omega 2$ in the silica waveguide. When this light is mixed with that from the center laser 56C, this phase distribution is preserved at the detectors 58, but the resultant frequency is the beat frequency, $\omega 0$, due to the mixing. This $\omega 0$ is the frequency of the RF transmission.

As this linear phase front is transferred to the aperture and radiated in the direction $\Theta$ from the broad-side, the differential phase shift between the radiating elements is $(2\pi/\lambda o) \, Dx \, \sin\Theta$, where $Dx$ is the radiating element (70) spacing, about half of the wavelength at the operating RF frequency. This phase shift is identical to that in the lens 54, equal to $(2\pi/\lambda g) \, dx \, \sin\Theta'$. From this condition, a relationship between the beam scan angle $\Theta$ and the offset angle of the laser can be derived, which is given by $$\frac{\sin\Theta}{\sin\Theta'} = \sqrt{\epsilon_r} \, \frac{\omega_2}{\omega_0} \, \frac{dx}{Dx}$$

Note that the beam direction can be switched by changing the location of the laser, or by changing the frequency of the laser 2, $\omega 2$, in a continuous manner.

To stabilize the RF frequency, the array 50 includes a phase lock loop (PLL) 80 driven by the master oscillator 90 at $\omega 0$. The output of the photodetector 62 is tapped to mix with the reference source 90 at RF mixer 92, and the DC output is used to tune the frequency of the laser 56C located at the center of the lens 54 at frequency $\omega 1$.

Figure 2:
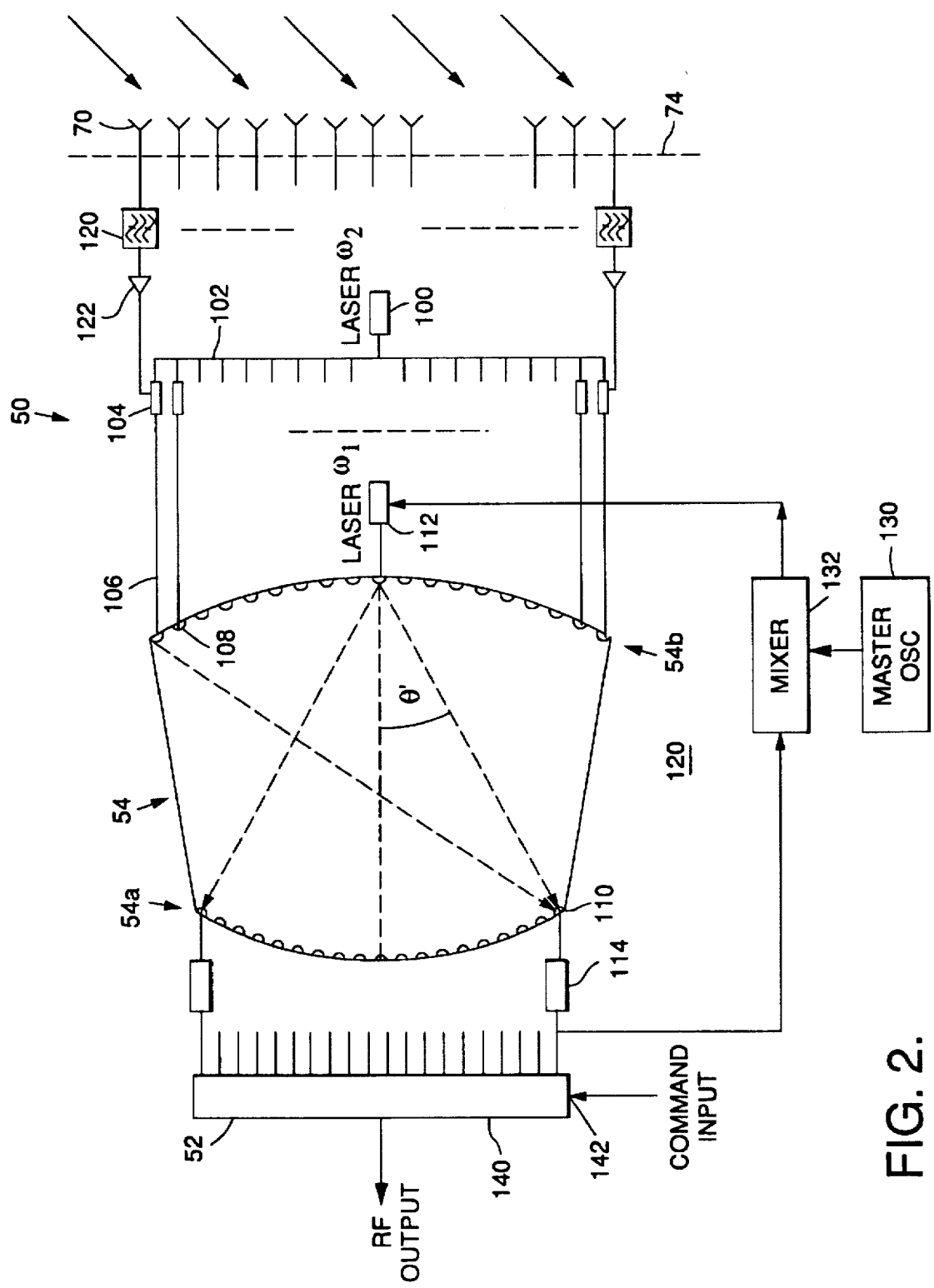
FIG. 2 is a simplified block diagram of the MMW array system of FIG. 1 operating in a receive mode.

For the receive mode of the array system 50 illustrated in FIG. 2, the process is reversed. The signals received at the radiating elements 70 are filtered by filters 120 and amplified by amplifiers 122 before being connected to the modulating signal input of optical signal modulators 104. The modulators 104 can be direct modulator devices or indirect/external modulators, such as Mach-Zender modulators. As shown in FIG. 2, a single laser 100 operating at $\omega 2$ supplies the light source to be modulated by the RF signal received at the radiating elements 70. An optical power divider 102 is used to split the light from this source into N signals, one for each array element 70 and each modulator 104. A set of equal line length fibers 106 feeds the RF modulated light to N emitters 108, which can be bead lens elements, equally spaced on the side 54B of the Rotman lens. Collectively, the light wave converges onto the optical receive elements 110, which can also comprise bead lens elements, on the side 54A displaced at the offset angle $\Theta'$ determined by the above equation. Likewise, the focal point can be controlled by varying the frequency of $\omega 2$. For detection of the RF signal, a reference laser source 112 located at the center of side 54B of the lens is used to illuminate all of the receive elements 110, so that the mixed down beat frequency $\omega 0$ can be detected by the photodetector 114 connected to each optical receive element. Similarly, for stability, a phase lock loop 120 is needed to control the frequency (color) of laser 112. A portion of the photodetector 114 output is tapped away to be mixed with the reference oscillator 130 signal at mixer 132, with the mixer output used to tune the frequency of the laser 112. The outputs of the photodetectors 114 are at the MMW operating frequency of the array antenna, and are connected to the n input ports of the 1:n RF switch 140. A command input to switch control port 142 selects which one of the n photodetector output signals is to be selected as the signal appearing as the RF output. The selection of the particular photodetector will determine the selected receive beam scan angle.

Figure 3:
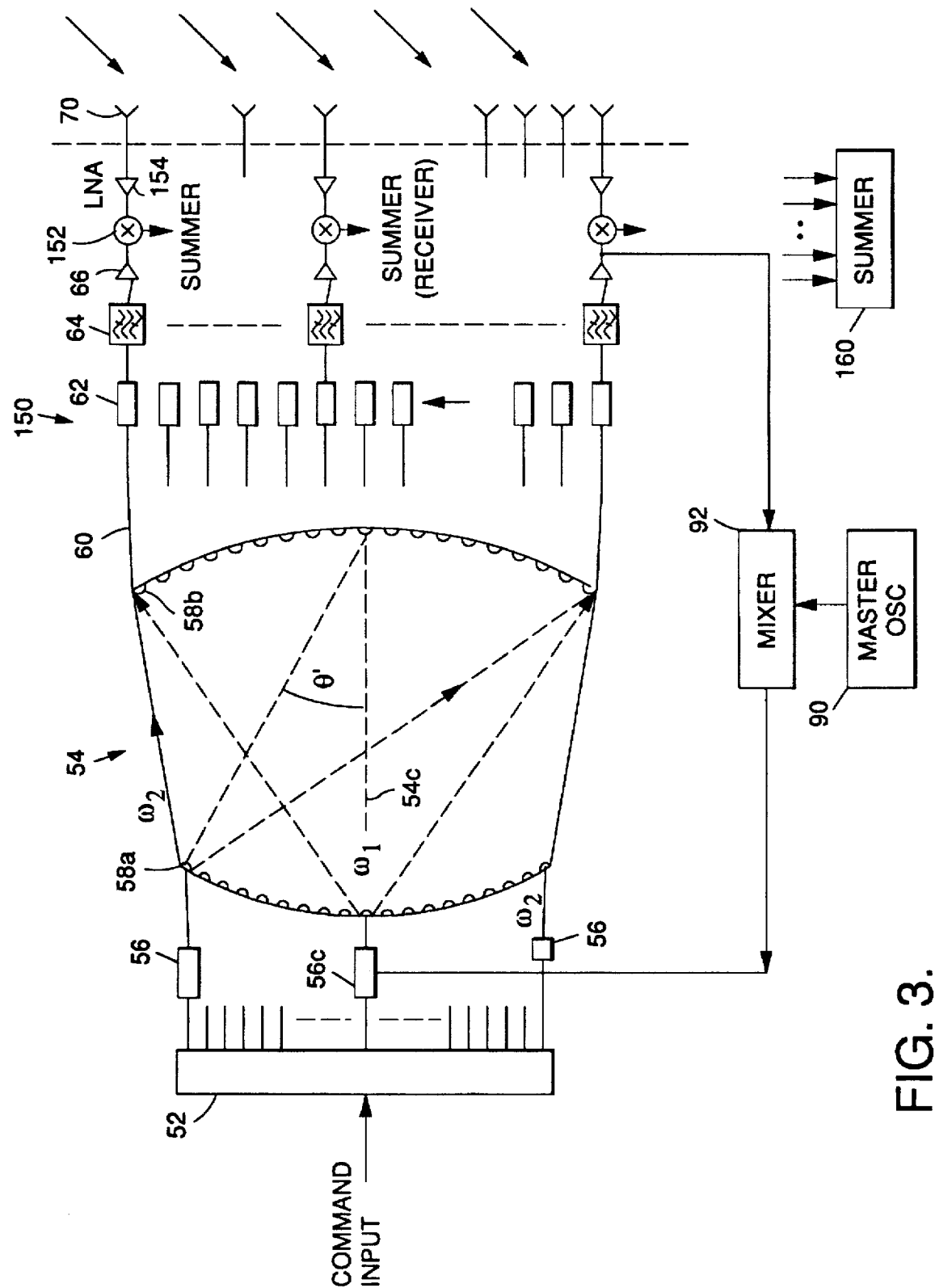
FIG. 3 is a simplified block diagram of an alternate array receiving mode system.

FIG. 3 illustrates an alternate embodiment of the receive mode. Here, the antenna configuration 150 is identical to the transmit system 50 of FIG. 1, and like numbers are used to identify like elements, except at the front end where a low noise amplifier (LNA) 154 and a mixer 152 are included for each radiating element 70. To receive a plane wave incident in the same direction as the transmit case, i.e., at O as illustrated in FIG. 3, a laser located at the opposite conjugate location O' is turned on to produce a linearly progressive phase front at frequency $\omega 2$ distributed along the output ports of the beamforming network, i.e., at the outputs of the amplifiers 66 in the exemplary network of FIG. 3. These signals are correspondingly mixed with the incoming signals at the same frequency $\omega 0$. The mixer will bring the information riding on $\omega 0$ down to the base band. The outputs of the mixers 152 are all equal so that a simple summing device 160 which sums the outputs of all the mixers 152 will produce maximum output for the receiver. This receive system operates as a spatial matched filter which generates a complex conjugate response to detect the incoming wave.

In summary, the disclosed invention is a compact optical beamforming system of MEW array antennas, designed for the generation of the radiation source and the control of the beam scanning by optical heterodyne techniques implemented with a silica Rotman lens.

The invention is not limited to systems employing optical space-fed Rotman lens arrangements. For example, the space-fed lens could be replaced with discrete optical splitters and fibers from each of n sources leading to the N receptors, i.e., with a constrained feed arrangement. This alternate approach has the disadvantage of complexity and increased size/volume. Nor is the invention limited to optical frequency heterodyning, as heterodyning at RF frequencies could also be implemented. The disadvantage is increased component size/volume.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A millimeter wave (MMW) array antenna employing an optical heterodyne system to provide a radiation source and beam scan control, the array antenna comprising:

a Rotman optical lens having a center axis;

n-1 lasers spaced around a lens transmit side for emitting light energy at a first optical frequency;

a center laser disposed at the center axis on said lens transmit side for emitting light energy at a second optical frequency, wherein an MMW operating frequency of the array antenna is equal to the beat frequency between the first and second optical frequencies;

N optical receive elements spaced along a Rotman lens receive side for receiving optical energy emitted by said lasers;

each of said n-1 lasers operating at said first frequency and said center laser operating at said second frequency have a wide field of view so as to illuminate all of said optical receive elements through said lens;

N equal length optical fibers each having a first fiber end connected to a corresponding one of said receive elements and a second end connected to a corresponding detector element;

N amplifiers each having an input connected to a corresponding second fiber end of one of said optical fibers, and an output connected to a corresponding MMW radiating element of said array antenna; and selector apparatus for selecting a particular one of said n-1 lasers to operate as an optical source, wherein the selection of said particular laser determines the beam direction generated by said array antenna.

2. The array antenna of claim 1 wherein said selector apparatus comprises a switch apparatus, having a command input port for receiving a selection command and n output ports, wherein said selection command determines which of said n-1 lasers operates at a particular instant of time to determine said beam direction.

3. The array antenna of claim 1 further including a phase lock loop for stabilizing the MMW frequency of the array antenna, comprising a master oscillator for providing a reference signal operating at a desired operating MMW frequency of said antenna, mixing means for mixing said reference signal with an output from on of said photodetectors to provide a DC control signal connected to a control input of said center laser to tune the output of said center laser and thereby stabilize said MMW frequency.

4. The array antenna of claim 1 wherein said Rotman lens includes a planar waveguide formed on a silicon substrate.

5. The array antenna of claim 1 wherein said receive elements are spaced apart by a distance dx, and wherein said receive elements have a size dimension which is about equal to the distance dx, so that the receive elements are touching each other to minimize spillover losses.

6. The array antenna of claim 1 wherein said detector elements do not respond to optical energy at said first or second wavelengths, and respond only to incident energy at said MMW operating frequency of the array antenna.

7. A millimeter wave (MMW) array antenna employing an optical heterodyne system to provide beam scan control, the array antenna comprising:

a Rotman optical lens having a center axis;

N radiative elements for receiving incident MMW radiation;

N optical modulators, each having a modulator control input terminal coupled to a corresponding one of said radiative elements, wherein the MMW energy received by said radiative element modulates said optical modulator;

a first laser for generating optical energy at a first optical frequency;

optical splitter apparatus having a single input for receiving said first laser optical energy and N outputs, said apparatus for splitting said laser optical energy into N optical signal components at said first optical frequency, and wherein each output is connected to an input of a corresponding one of said optical modulators, wherein each modulator is arranged to modulate a given one of said N optical signal components;

said Rotman lens having N emitter ports arranged on a receive side of said Rotman lens, said emitter ports being connected by equal length optical fibers to corresponding outputs of said optical modulators;

a center laser disposed at the center axis on said lens receive side for emitting light energy at a second optical frequency, wherein an MMW operating frequency of the array antenna is equal to the beat frequency between the first and second optical frequencies;

n optical receive elements spaced along a Rotman lens transmit side for receiving optical energy emitted by said lasers;

said center laser and said optical emitter elements having a wide field of view so as to illuminate all of said optical receive elements through said lens;

each of said n receive elements connected to a corresponding detector element;

selector apparatus for selecting a particular one of the outputs of said detector elements to provide a MMW receive signal for said antenna, wherein the selection of said particular detector element output determines the beam direction generated by said array antenna.

8. The array antenna of claim 7 wherein said selector apparatus comprises a switch apparatus, having n input ports and an output port, wherein a selection command determines which of said n detector element output signals is selected at a particular instant of time to determine said beam direction.

9. The array antenna of claim 7 further including a phase lock loop for stabilizing the MEW frequency of the array antenna, comprising a master oscillator for providing a reference signal operating at a desired operating MMW frequency of said antenna, mixing means for mixing said reference signal with an output from on of said photodetectors to provide a DC control signal connected to a control input of said center laser to tune the output of said center laser and thereby stabilize said MMW frequency.

10. The array antenna of claim 7 wherein said Rotman lens includes a planar waveguide formed on a silicon substrate.

11. The array antenna of claim 7 wherein said receive elements are spaced apart by a distance dx, and wherein said receive elements have a size dimension which is about equal to the distance dx, so that the receive elements are touching each other to minimize spillover losses.

12. The array antenna of claim 7 wherein said detector elements do not respond to optical energy at said first or second wavelengths, and respond only to incident energy at said MMW operating frequency of the array antenna.

13. A millimeter wave (MMW) array antenna employing an optical heterodyne system to provide beam scan control, the array antenna comprising:

a Rotman optical lens having a center axis;

n-1 laser sources spaced around a lens transmit side for emitting light energy at a first optical frequency;

a center laser source disposed at the center axis on said lens transmit side for emitting light energy at a second optical frequency, wherein an MMW operating frequency of the array antenna is equal to the beat frequency between the first and second optical frequencies;

N optical receive elements spaced along a Rotman lens receive side for receiving optical energy emitted by said laser sources;

each of said n-1 laser sources and said center laser source having a wide field of view so as to illuminate all of said optical receive elements through said lens;

N equal length optical fibers each having a first fiber end connected to a corresponding one of said receive elements and a second end connected to a corresponding detector element;

N amplifiers each having an input connected to a corresponding detector element and an output connected to a corresponding mixer device;

N MMW receive antenna elements;

N low noise amplifiers each having an input connected to a corresponding receive element and an output connected to a corresponding one of N mixer devices for mixing with a corresponding signal from a photodetector device;

summing circuitry for summing output signals from each of said N mixer devices to provide a summed output; and selector apparatus for selecting a particular one of said n-1 laser sources to operate as an optical source, wherein the selection of said particular laser source determines the receive beam direction for said array antenna.

14. The array antenna of claim 13 wherein said selected laser source illuminates said receive elements to produce a linearly progressive phase front distribution along outputs of said photodetector devices.

15. The array antenna of claim 14 wherein said receive beam direction is at an opposite conjugal angular position relative to said center axis.

16. The array antenna of claim 13 wherein said selector apparatus comprises a switch apparatus, having a command input port for receiving a selection command and n output ports, wherein said selection command determines which of said n-1 lasers operates at a particular instant of time to determine said beam direction.

17. The array antenna of claim 13 further including a phase lock loop for stabilizing the MMW frequency of the array antenna, comprising a master oscillator for providing a reference signal operating at a desired operating MMW frequency of said antenna, mixing means for mixing said reference signal with an output from on of said photodetectors to provide a DC control signal connected to a control input of said center laser to tune the output of said center laser and thereby stabilize said MMW frequency.

18. The array antenna of claim 13 wherein said Rotman lens includes a planar waveguide formed on a silicon substrate.

19. The array antenna of claim 13 wherein said receive elements are spaced apart by a distance dx, and wherein said receive elements have a size dimension which is about equal to the distance dx, so that the receive elements are touching each other to minimize spillover losses.

20. The array antenna of claim 13 wherein said detector elements do not respond to optical energy at said first or second wavelengths, and respond only to incident energy at said MMW operating frequency of the array antenna.

21. An array antenna employing a heterodyne system to provide beam scan control, the array antenna comprising:

a first plurality of radiation sources, each operating at a first frequency and having an effective spacing between adjacent sources;

a second radiation source operating at a second frequency and centrally positioned with respect to the first plurality of radiation sources, wherein an operating frequency of the array antenna is equal to a beat frequency between the first and second frequencies;

a third plurality of radiation receiving elements, spaced from the first and second pluralities of radiation sources and from each other;

first radiation transmission means for conveying the radiation from each of said first plurality of radiation sources to each of said radiation receiving elements to achieve a differential phase shift between signals received at adjacent receive elements due to radiation received from a given one of said radiation sources;

second radiation transmission means for conveying in phase the radiation from the second source to each receiving element;

a plurality of equal length transmission lines each having a first end connected to a corresponding one of said receive elements and a second end connected to a corresponding transducer element, each transducer element producing a transducer output signal at said beat frequency, the respective transducer signals reproducing said differential phase shifts;

a plurality of radiating element;

means for driving said radiating elements with said transducer signals; and selector apparatus for selecting a particular one of said first plurality of first radiation sources, wherein the selection of said particular first radiation source determines the beam direction generated by said array antenna.

22. The array antenna of claim 21 wherein said selector apparatus comprises a switch apparatus, having a command input port for receiving a selection command and a plurality of output ports, wherein said selection command determines which of said first radiation sources operates at a particular instant of time to determine said beam direction.

* * * * *